(12) United States Patent
Shiau et al.

(10) Patent No.: US 8,305,511 B2
(45) Date of Patent: *Nov. 6, 2012

(54) BACKLIGHT MODULE, STEREO DISPLAY APPARATUS, AND BEAM SPLITTING FILM

(75) Inventors: Tzeng-Ke Shiau, Hsin-Chu (TW);
Ching-Shiang Li, Hsin-Chu (TW);
Wei-Chung Chao, Hsin-Chu (TW);
Chao-Hung Weng, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/037,373

(22) Filed: Mar. 1, 2011

(65) Prior Publication Data

US 2011/0228387 A1 Sep. 22, 2011

(30) Foreign Application Priority Data

Mar. 18, 2010 (TW) .................................. 99108046 A

(51) Int. Cl.
*G02F 1/136* (2006.01)
(52) U.S. Cl. ................. 349/51; 349/15; 349/19; 349/33; 349/61; 349/62
(58) Field of Classification Search .................. 349/15, 349/19, 33, 51, 61, 62, 63
See application file for complete search history.

(56) References Cited

U.S. PATENT DOCUMENTS

| 6,172,809 | B1* | 1/2001 | Koike et al. ............. 359/485.04 |
| 7,303,323 | B2 | 12/2007 | Choi et al. |
| 7,529,048 | B2 | 5/2009 | Lin |
| 2006/0209428 | A1 | 9/2006 | Dobbs et al. |
| 2011/0221996 | A1* | 9/2011 | Shiau et al. ..................... 349/62 |

FOREIGN PATENT DOCUMENTS

| TW | 475334 | 2/2002 |
| TW | M294667 | 7/2006 |

* cited by examiner

*Primary Examiner* — Jennifer Doan
(74) *Attorney, Agent, or Firm* — Jianq Chyun IP Office

(57) ABSTRACT

A beam splitting film including a light transmissive plate and a plurality of strip protrusion groups is provided. The light transmissive plate has a first surface and a second surface. The strip protrusion groups are disposed on the second surface. Each of the strip protrusion groups includes a first strip protrusion and a second strip protrusion. The first strip protrusion has a first strip surface and a second strip surface inclined relative to the second surface. The second strip protrusion has a third strip surface and a fourth strip surface inclined relative to the second surface. An average slope of the first strip surface is not equal to an average slope of the third strip surface. An average slope of the second strip surface is not equal to an average slope of the fourth strip surface. A backlight module and a stereo display apparatus are also provided.

20 Claims, 5 Drawing Sheets

BACKLIGHT MODULE, STEREO DISPLAY APPARATUS, AND BEAM SPLITTING FILM

CROSS-REFERENCE TO RELATED APPLICATION

This application claims the priority benefit of Taiwan application serial no. 99108046, filed on Mar. 18, 2010. The entirety of the above-mentioned patent application is hereby incorporated by reference herein and made a part of this specification.

BACKGROUND

1. Field of the Invention

The invention relates to a light source module, a display, and an optical film. More particularly, the invention relates to a backlight module, a stereo display apparatus, and a beam splitting film.

2. Description of Related Art

With development of display technology, displays having better image quality, richer color performance, and better performance effect are continuously developed. In recent years, a stereo display technology has extended from cinema applications to home display applications. Since a key technique of the stereo display technology is to ensure a left eye and a right eye of a user to respectively view left-eye images and right-eye images of different viewing angles, according to the conventional stereo display technology, the user generally wears a special pair of glasses to filter the left-eye images and the right-eye images.

However, to wear the special pair of glasses may generally cause a lot of inconveniences, especially for a nearsighted or farsighted user who has to wear a pair of glasses with corrected vision, and the extra pair of special glasses may cause discomfort and inconvenience. Therefore, a naked-eye stereo display technology becomes one of the key focuses in researches and developments. However, according to the current naked-eye stereo display technology, only one vision zone may be generated, and such vision zone is generally located at a center of a display. When the user leaves the vision zone, the user may not view the stereo image. Therefore, according to such stereo display technology, multiple users may not simultaneously view the stereo images.

Taiwan Patent No. 475334 discloses a dichroic layer, wherein an upper surface of the dichroic layer has a two-dimensional micro lens array, and a lower layer of the dichroic layer has a grating structure. Moreover, U.S. Pat. No. 7,303,323 discloses a prism, wherein a lower surface of the prism has a prism structure, and a hypotenuse of the prism is a circular arc. Moreover, Taiwan Patent No. M294667 and U.S. Pat. No. 7,529,048 disclose an optical film having a base film and prisms, wherein hypotenuse slopes of an upper prism and a lower prism are different, and the hypotenuse slope of the lower prism is less than the hypotenuse slope of the upper prism. U.S. Patent publication No. 20060209428 discloses an optical film structure having micro lenses and prisms, wherein the micro lenses are one-by-one corresponding to the prisms.

SUMMARY

Accordingly, the invention is directed to a backlight module. The backlight module may form light beams capable of being viewed by a left eye and a right eye of a user, and may simultaneously form a plurality of vision zones.

The invention is directed to a stereo display apparatus, and the stereo display apparatus may form a plurality of vision zones.

The invention is directed to a beam splitting film, and the beam splitting film may split an incident light beam into a plurality of light beams with different propagating angles, so as to form a plurality of vision zones.

Additional aspects and advantages of the invention may be set forth in the description of the techniques disclosed in the invention.

To achieve at least one of or other aforementioned objectives, an embodiment of the invention provides a beam splitting film including a light transmissive plate and a plurality of strip protrusion groups. The light transmissive plate has a first surface and a second surface opposite to the first surface, wherein the first surface is a light emitting surface. The strip protrusion groups are disposed on the second surface. Each of the strip protrusion groups includes a first strip protrusion and a second strip protrusion disposed on the second surface and adjacent to each other. The first strip protrusion of each of the strip protrusion groups has a first strip surface and a second strip surface inclined relative to the second surface. The second strip protrusion of each of the strip protrusion groups has a third strip surface and a fourth strip surface inclined relative to the second surface. The second strip surface is located between the first strip surface and the third strip surface, and the third strip surface is located between the second strip surface and the fourth strip surface. An inclining direction of the first strip surface relative to the second surface is the same as an inclining direction of the third strip surface relative to the second surface. An inclining direction of the second strip surface relative to the second surface is the same as an inclining direction of the fourth strip surface relative to the second surface. An average slope of the first strip surface relative to the second surface is not equal to an average slope of the third strip surface relative to the second surface. An average slope of the second strip surface relative to the second surface is not equal to an average slope of the fourth strip surface relative to the second surface.

Another embodiment of the invention provides a backlight module including the aforementioned beam splitting film, a light guide plate, and two light emitting devices. The light guide plate is disposed at a side of the beam splitting film. The light guide plate has a third surface, a fourth surface opposite to the third surface, and two light incident surfaces connected to the third surface and the fourth surface. The two light incident surfaces are respectively located at two opposite sides of the light guide plate. The third surface is located between the second surface and the fourth surface, and the second surface is located between the first surface and the third surface. The two light emitting devices are respectively disposed beside the two light incident surfaces, and are capable of emitting two light beams. The two light beams are respectively capable of entering the light guide plate through the two light incident surfaces, and are capable of being transmitted to the beam splitting film through the third surface, wherein the two light emitting devices are capable of alternately flickering.

Another embodiment of the invention provides a stereo display apparatus including the aforementioned backlight module and a liquid crystal display (LCD) panel. The LCD panel is disposed at a side of the backlight module, and the first surface of the light transmissive plate is located between the LCD panel and the second surface of the light transmissive plate.

According to the above descriptions, the embodiments of the invention may have at least one of the following advantages or functions. In the beam splitting film, the backlight module, and the stereo display apparatus of the embodiments of the invention, since in each of the strip protrusion groups, the average slope of the first strip surface is different to the average slope of the third strip surface, and the average slope of the second strip surface is different to the average slope of the fourth strip surface, the light beam may be refracted into different directions, so as to form a plurality of vision zones. In this way, multiple users may simultaneously view and share stereo images from different viewing angles.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the disclosure.

DETAILED DESCRIPTION OF DISCLOSED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
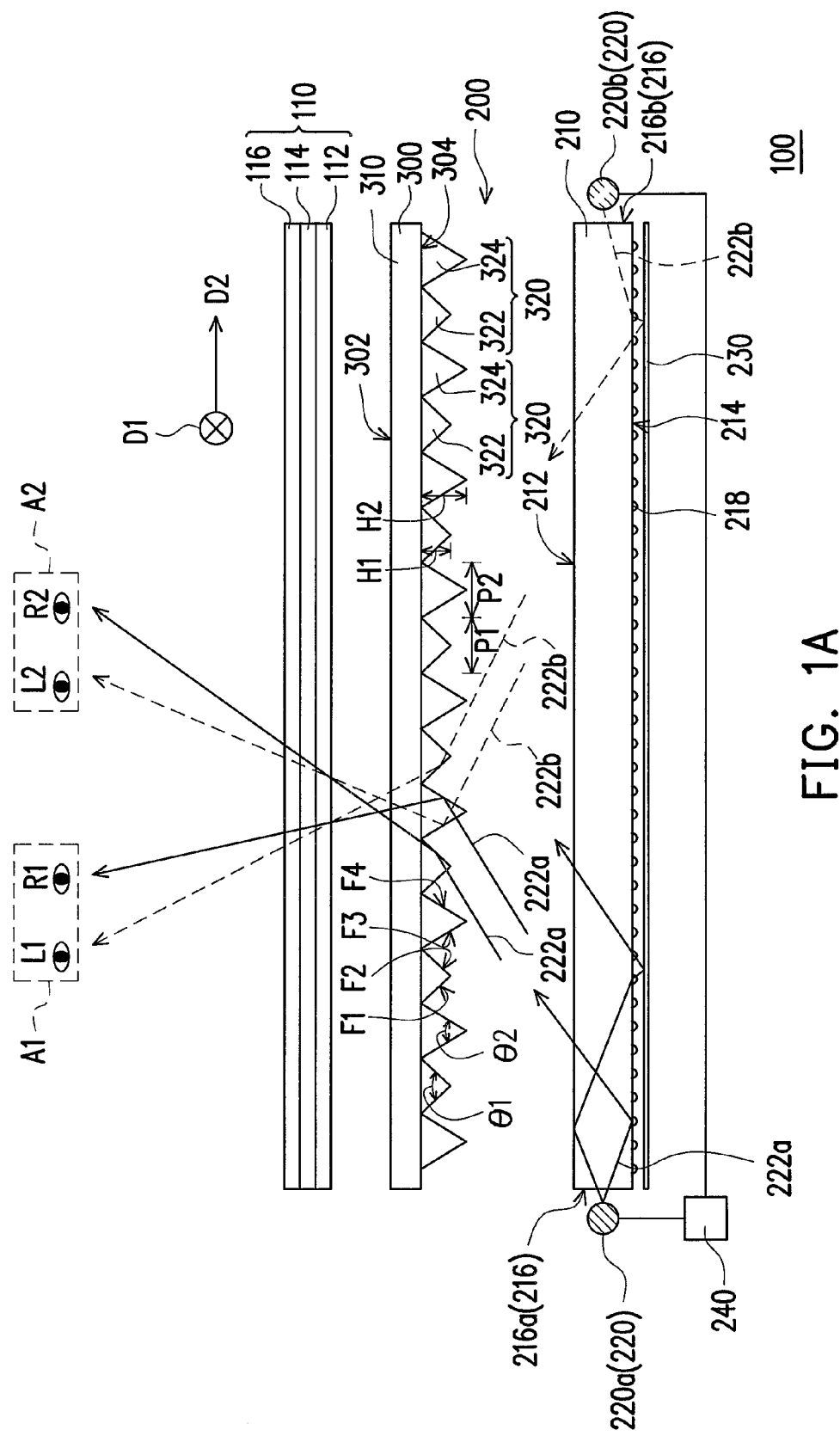
FIG. 1A is a cross-sectional view of a stereo display apparatus according to an embodiment of the invention.
Figure 1B:
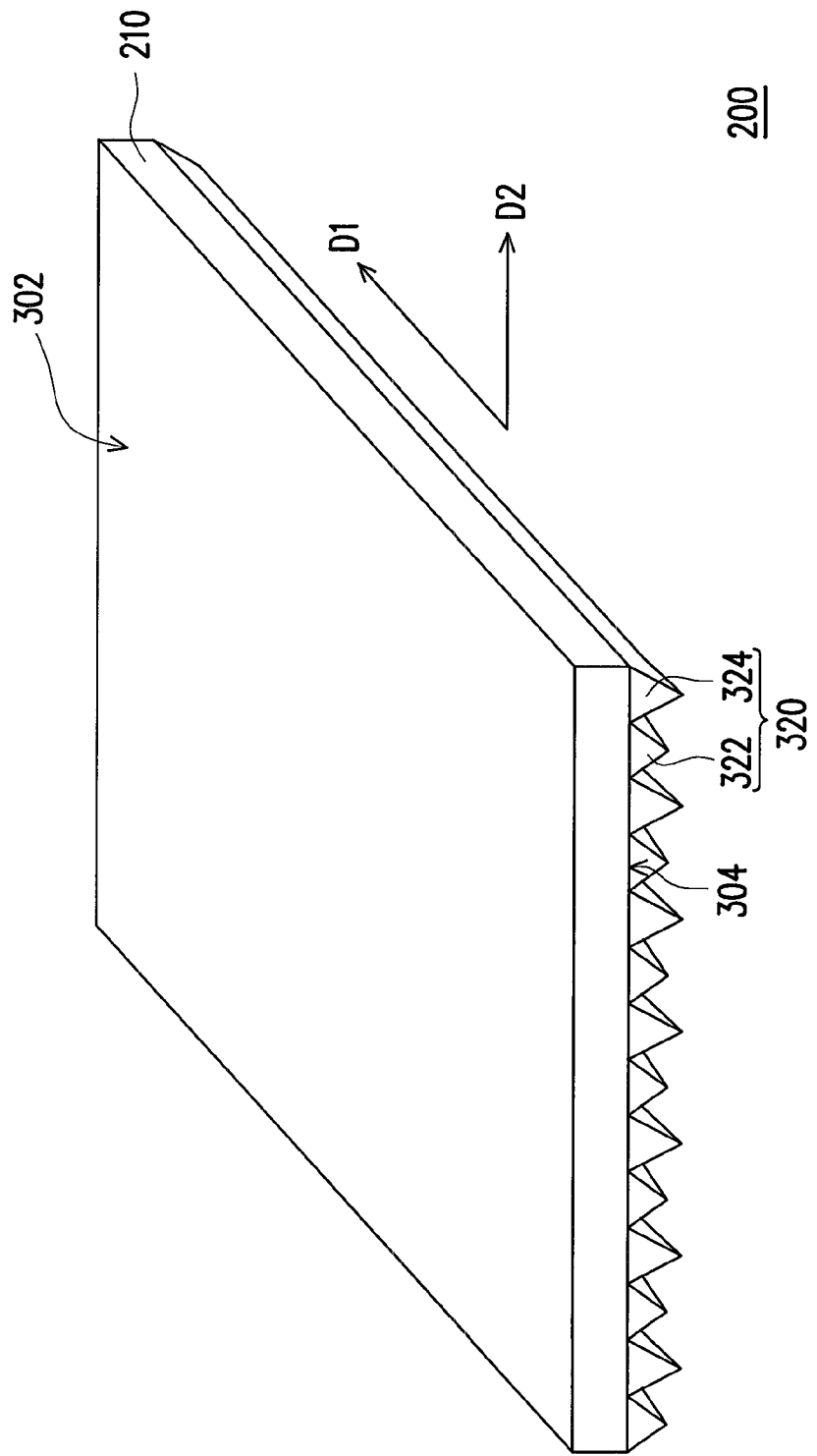
FIG. 1B is a three-dimensional view of a beam splitting film of FIG. 1A.

Referring to FIG. 1A and FIG. 1B, the stereo display apparatus 100 of the embodiment includes a backlight module 200 and a liquid crystal display (LCD) panel 110. The backlight module 200 includes a beam splitting film 300, a light guide plate 210, and two light emitting devices 220 (in FIG. 1A, light emitting devices 220a and 220b are taken as an example). The beam splitting film 300 includes a light transmissive plate 310 and a plurality of strip protrusion groups 320. The light transmissive plate 310 has a first surface 302 and a second surface 304 opposite to the first surface 302, wherein the first surface 302 is a light emitting surface. The strip protrusion groups 320 are disposed on the second surface 304, wherein each of the strip protrusion groups 320 includes a first strip protrusion 322 and a second strip protrusion 324 disposed on the second surface 304 and adjacent to each other. A magnitude of a first vertex angle θ1 of the first strip protrusion 322 away from the second surface 304 is not equal to a magnitude of a second vertex angle θ2 of the second strip protrusion 324 away from the second surface 304.

The light guide plate 210 is disposed at a side of the beam splitting film 300. The light guide plate 210 has a third surface 212, a fourth surface 214 opposite to the third surface 212, and two light incident surfaces 216 (in FIG. 1A, light incident surfaces 216a and 216b are taken as an example) connected to the third surface 212 and the fourth surface 214. The two light incident surfaces 216a and 216b are respectively located at two opposite sides of the light guide plate 210, the third surface 212 is located between the second surface 304 and the fourth surface 214, and the second surface 304 is located between the first surface 302 and the third surface 212. The two light emitting devices 220a and 220b are respectively disposed beside the two light incident surfaces 216a and 216b, and are capable of emitting two light beams 222a and 222b. In the embodiment, the light emitting device 220 is, for example, a cold cathode fluorescent lamp (CCFL). However, in the other embodiments, the light emitting device 220 may also be a light-emitting diode (LED) or other suitable light-emitting devices. The two light beams 222a and 222b respectively enter the light guide plate 210 through the two light incident surfaces 216a and 216b, and are respectively transmitted to the beam splitting film 300 through the third surface 212.

In detail, the light beams 222a and 222b are continuously and totally reflected between the third surface 212 and the fourth surface 214 after the light beams 222a and 222b entering the light guide plate 210. However, a diffusion microstructure 218 on the surface (for example, the third surface 212 or the fourth surface 214, and in FIG. 1A, the fourth surface 214 is taken as an example) of the light guide plate 210 may spoil the total reflection, so that the light beams 222a and 222b may emit out from the light guide plate 210 through the third surface 212 to reach the beam splitting film 300, or the light beams 222a and 222b are transmitted to a reflection sheet 230 below the light guide plate 210, and are reflected by the reflection sheet 230 to further penetrate through the fourth surface 214 and the third surface 212 to reach the beam splitting film 300.

Moreover, the light emitting devices 220a and 220b are capable of alternately flickering. In other words, when the light emitting device 220a emits the light beam 222a, the light emitting device 220b may not emit the light beam 222b, and when the light emitting device 220b emits the light beam 222b, the light emitting device 220a may not emit the light beam 222a. In the embodiment, a control unit 240 electrically connected to the two light emitting devices 220a and 220b may be used to drive the light emitting devices 220a and 220b to alternately flicker.

The LCD panel 110 is disposed at a side of the backlight module 200, wherein the first surface 302 is located between the LCD panel 110 and the second surface 304. In the embodiment, the LCD panel 110 includes an active device array substrate 112, a liquid crystal layer 114, and an opposite substrate 116. The active device array substrate 112 is, for example, a thin film transistor (TFT) array substrate, and the opposite substrate 116 is, for example, a color filter array substrate. The liquid crystal layer 114 is disposed between the active device array substrate 112 and the opposite substrate 116.

In the embodiment, each of the first strip protrusions 322 and the second strip protrusions 324 of the strip protrusion groups 320 extends along a first direction D1, and the first strip protrusions 322 and the second strip protrusions 324 of the strip protrusion groups 320 are arranged along a second direction D2. In the embodiment, the first direction D1 is substantially perpendicular to the second direction D2. Moreover, in the embodiment, the strip protrusion groups 320 and the light transmissive plate 310 are formed individually. However, in other embodiments, the strip protrusion groups 320 and the light transmissive plate 310 may also be formed integrally.

In the embodiment, the first strip protrusion 322 of each of the strip protrusion groups 320 has a first strip surface F1 and a second strip surface F2 inclined relative to the second surface 304, and the second strip protrusion 324 of the strip protrusion group 320 has a third strip surface F3 and a fourth strip surface F4 inclined relative to the second surface 304. A junction of the first strip surface F1 and the second strip surface F2 forms the first vertex angle θ1, and a junction of the third strip surface F3 and the fourth strip surface F4 forms the second vertex angle θ2. The second strip surface F2 is located between the first strip surface F1 and the third strip surface F3, and the third strip surface F3 is located between the second strip surface F2 and the fourth strip surface F4. In the embodiment, the magnitude of the first vertex angle θ1 is not equal to the magnitude of the second vertex angle θ2. Moreover, an average slope of the first strip surface F1 relative to the second surface 304 is not equal to an average slope of the third strip surface F3 relative to the second surface 304, and an average slope of the second strip surface F2 relative to the second surface 304 is not equal to an average slope of the fourth strip surface F4 relative to the second surface 304.

In detail, in the embodiment, the magnitude of the first vertex angle θ1 is greater than the magnitude of the second vertex angle θ2, an absolute value of the average slope of the first strip surface F1 is smaller than an absolute value of the average slope of the third strip surface F3 (assuming that a slope of the strip surface extending from the top left to the bottom right in FIG. 1A is defined as negative, and a slope of the strip surface extending from the top right to the bottom left in FIG. 1A is defined as positive), and an absolute value of the average slope of the second strip surface F2 is smaller than an absolute value of the average slope of the fourth strip surface F4. Moreover, in the embodiment, an inclining direction of the first strip surface F1 relative to the second surface 304 is the same as an inclining direction of the third strip surface F3 relative to the second surface 304 (i.e. the average slopes of the first strip surface F1 and the third strip surface F3 are negative values), and an inclining direction of the second strip surface F2 relative to the second surface 304 is the same as an inclining direction of the fourth strip surface F4 relative to the second surface 304 (i.e. the average slopes of the second strip surface F2 and the fourth strip surface F4 are positive values).

In the embodiment, the first strip surface F1, the second strip surface F2, the third strip surface F3, and the fourth strip surface F4 are all planes, i.e. the first strip protrusion 322 and the second strip protrusion 324 are all prism rods. In the embodiment, the absolute value of the average slope of the first strip surface F1 is equal to the absolute value of the average slope of the second strip surface F2, and the absolute value of the average slope of the third strip surface F3 is equal to the absolute value of the average slope of the fourth strip surface F4, though the invention is not limited thereto.

In the embodiment, since the average slope of the first strip surface F1 is not equal to the average slope of the third strip surface F3, and the average slope of the second strip surface F2 is not equal to the average slope of the fourth strip surface F4, the first strip protrusion 322 and the second strip protrusion 324 may refract the light beam 222a towards two different directions, and may refract the light beam 222b towards two different directions, so as to form two different vision zones A1 and A2.

In detail, a part of the light beam 222a from the light guide plate 210 sequentially penetrates through the first strip surface F1 of the first strip protrusion 322 and is totally reflected by the second strip surface F2, so that this part of the light beam 222a is transmitted top-rightwards to reach the LCD panel 110, and is further transmitted to a right eye R2 of a user located in the vision zone A2 after carrying an image provided by the LCD panel 110. On the other hand, another part of the light beam 222a from the light guide plate 210 sequentially penetrates through the third strip surface F3 of the second strip protrusion 324 and is totally reflected by the fourth strip surface F4, so that this part of the light beam 222a is transmitted top-leftwards to reach the LCD panel 110, and is further transmitted to a right eye R1 of a user located in the vision zone A1 after carrying an image provided by the LCD panel 110. Moreover, a part of the light beam 222b from the light guide plate 210 sequentially penetrates through the second strip surface F2 of the first strip protrusion 322 and is totally reflected by the first strip surface F1, so that this part of the light beam 222b is transmitted top-leftwards to reach the LCD panel 110, and is further transmitted to a left eye L1 of the user located in the vision zone A1 after carrying an image provided by the LCD panel 110. On the other hand, another part of the light beam 222b from the light guide plate 210 sequentially penetrates through the fourth strip surface F4 of the second strip protrusion 324 and is totally reflected by the third strip surface F3, so that this part of the light beam 222b is transmitted top-rightwards to reach the LCD panel 110, and is further transmitted to a left eye L2 of the user located in the vision zone A2 after carrying an image provided by the LCD panel 110.

In this way, after the light beam 222b transmitted to the left eye L1 and the light beam 222a transmitted to the right eye R1 are observed by the user located in the vision zone A1, a visual effect of stereo image may be formed in the user's brain. On the other hand, after the light beam 222b transmitted to the left eye L2 and the light beam 222a transmitted to the right eye R2 are observed by the user located in the vision zone A2, the visual effect of stereo image may be formed in the user's brain. Therefore, the stereo display apparatus 100 of the embodiment may form two vision zones A1 and A2 to facilitate more users to simultaneously view and share the stereo images from different viewing angles. Moreover, since a plurality of vision zones may be formed to facilitate multiple users to simultaneously view the stereo images, a size of the stereo display apparatus 100 may be enlarged to facilitate utilization of more users.

Figure 2:
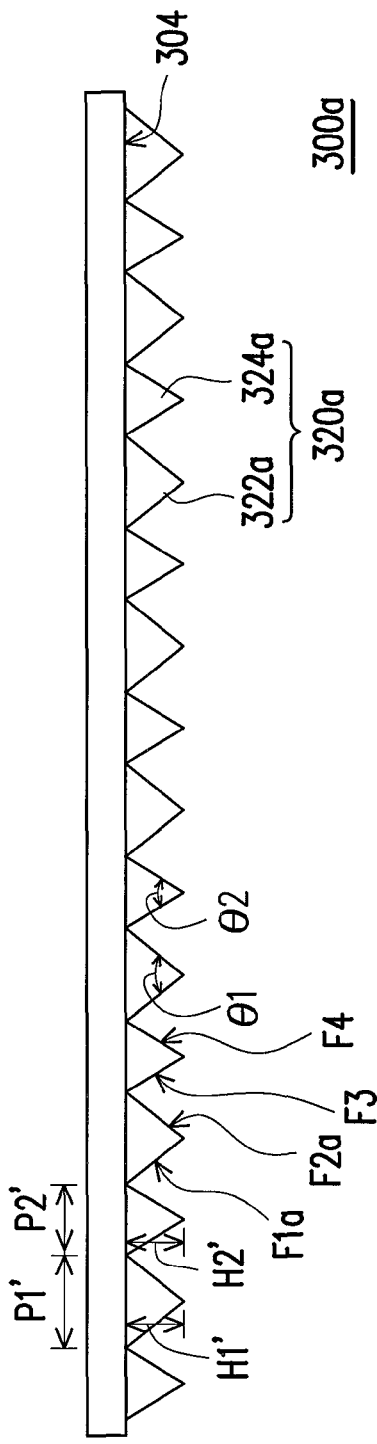
FIG. 2 is diagram illustrating a variation of a beam splitting film of FIG. 1A.

In the embodiment, a width P1 of the first strip protrusion 322 of each of the strip protrusion groups 320 along a direction parallel to the second surface 304 is equal to a width P2 of the second strip protrusion 324 of the strip protrusion group 320 along the direction parallel to the second surface 304. A reason why the magnitude of the first vertex angle θ1 is different to the magnitude of the second vertex angle θ2 is that a height H1 of the first strip protrusion 322 of each of the strip protrusion groups 320 along a direction perpendicular to the second surface 304 is different to a height H2 of the second strip protrusion 324 of the strip protrusion group 320 along the direction perpendicular to the second surface 304, and in FIG. 1A, the height H1 is smaller than the height H2. However, referring to FIG. 2, in another embodiment, a beam splitting film 300a may be used to replace the beam splitting film 300 of FIG. 1A. The beam splitting film 300a is similar to the beam splitting film 300, and differences therebetween are as follows. In the beam splitting film 300a, a height H1' of a first strip protrusion 322a of each of strip protrusion groups 320a along a direction perpendicular to the second surface 304 is equal to a height H2' of a second strip protrusion 324a of the strip protrusion group 320a along the direction perpendicular to the second surface 304. However, a width P1' of the first strip protrusion 322a of each of the strip protrusion groups 320a along a direction parallel to the second surface 304 is different to a width P2' of the second strip protrusion 324a of the strip protrusion group 320a along the direction parallel to the second surface 304. In FIG. 2, the width P1' is, for example, greater than the width P2', so that the magnitude of the first vertex angle θ1 is different to the magnitude of the second vertex angle θ2, and therefore an average slope of a first strip surface F1a of each of the strip protrusion groups 320a is different to an average slope of a third strip surface F3, and an average slope of a second strip surface F2a is different to an average slope of a fourth strip surface F4. However, in another embodiment not illustrated, the width P1' is different to the width P2', the height H1' is different to the height H2', and meanwhile the magnitude of the first vertex angle θ1 is different to the magnitude of the second vertex angle θ2.

Figure 3:
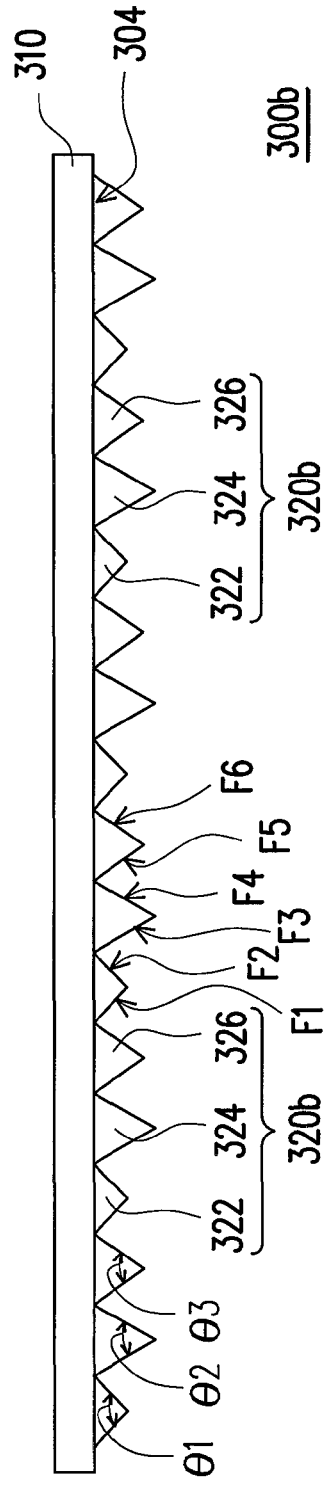
FIG. 3 is a cross-sectional view of a beam splitting film in a stereo display apparatus according to another embodiment of the invention.

Referring to FIG. 3, the beam splitting film 300b of the embodiment is similar to the beam splitting film 300 of FIG. 1A and FIG. 1B, and differences therebetween are as follows. In the beam splitting film 300b of the embodiment, each of the strip protrusion groups 320b further includes a third strip protrusion 326. The third strip protrusion 326 has a fifth strip surface F5 and a sixth strip surface F6 inclined relative to the second surface 304. An inclining direction of the fifth strip surface F5 relative to the second surface 304 is the same as the inclining directions of the first strip surface F1 and the third strip surface F3 of the strip protrusion group 320b relative to the second surface 304, and an inclining direction of the sixth strip surface F6 relative to the second surface 304 is the same as the inclining directions of the second strip surface F2 and the fourth strip surface F4 of the strip protrusion group 320b relative to the second surface 304. An average slope of the fifth strip surface F5 relative to the second surface 304 is different to the average slope of the first strip surface F1 relative to the second surface 304, and is different to the average slope of the third strip surface F3 relative to the second surface 304. An average slope of the sixth strip surface F6 relative to the second surface 304 is different to the average slope of the second strip surface F2 relative to the second surface 304, and is different to the average slope of the fourth strip surface F4 relative to the second surface 304. Moreover, in the embodiment, a magnitude of a third vertex angle θ3 of the third strip protrusion 326 away from the second surface 304 is different to the magnitude of the first vertex angle θ1, and the magnitude of the third vertex angle θ3 is different to the magnitude of the second vertex angle θ2. Since the three strip protrusions with different strip surface slopes and different vertex angles may refract the light beam into three different directions, the stereo display apparatus applying the beam splitting film 300b may form three different vision zones, so that more users may simultaneously view the stereo images. Deduced by analogy, in other embodiments, each of the strip protrusion groups may include N strip protrusions with different vertex angles, so as to generate N vision zones, wherein N is an integer greater than 3. When a number of the vision zones is suitably increased, the number of users capable of simultaneously viewing and sharing the stereo images is accordingly increased.

In the embodiment, the magnitudes of the first vertex angle θ1, the second vertex angle θ2, and the third vertex angle θ3 are different due to different heights of the first strip protrusion 322, the second strip protrusion 324, and the third strip protrusion 326. However, in other embodiments, the magnitudes of the first vertex angle θ1, the second vertex angle θ2, and the third vertex angle θ3 are different due to different widths of the first strip protrusion 322, the second strip protrusion 324, and the third strip protrusion 326. Alternatively, in another embodiment, the heights and the widths of the first strip protrusion 322, the second strip protrusion 324, and the third strip protrusion 326 may be all different.

Figure 4:
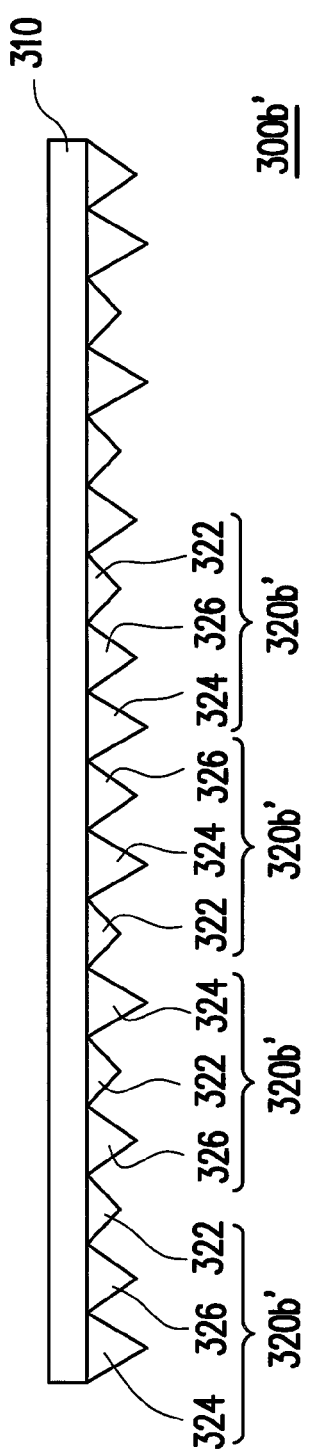
FIG. 4 is a cross-sectional view of a beam splitting film in a stereo display apparatus according to still another embodiment of the invention.

Referring to FIG. 4, the beam splitting film 300b' of the embodiment is similar to the beam splitting film 300b of FIG. 3, and a difference therebetween is that an arranging sequence of the first strip protrusion 322, the second strip protrusion 324, and the third strip protrusion 326 of each of the strip protrusion groups 320b' in the beam splitting film 300b' of the embodiment may be different. In detail, in a certain strip protrusion group 320b', the arranging sequence from the left to the right is the second strip protrusion 324, the third strip protrusion 326, and the first strip protrusion 322. In another strip protrusion group 320b', the arranging sequence from the left to the right is the third strip protrusion 326, the first strip protrusion 322, and the second strip protrusion 324. The arranging sequence may be arbitrarily varied in different strip protrusion groups 320b', as long as each of the strip protrusion groups 320b' includes the first strip protrusion 322, the second strip protrusion 324, and the third strip protrusion 326. Similarly, an arranging sequence of the first strip protrusion 322 and the second strip protrusion 324 of each of the strip protrusion groups 320 in the beam splitting film 300 of FIG. 1A may also be different.

Figure 5:
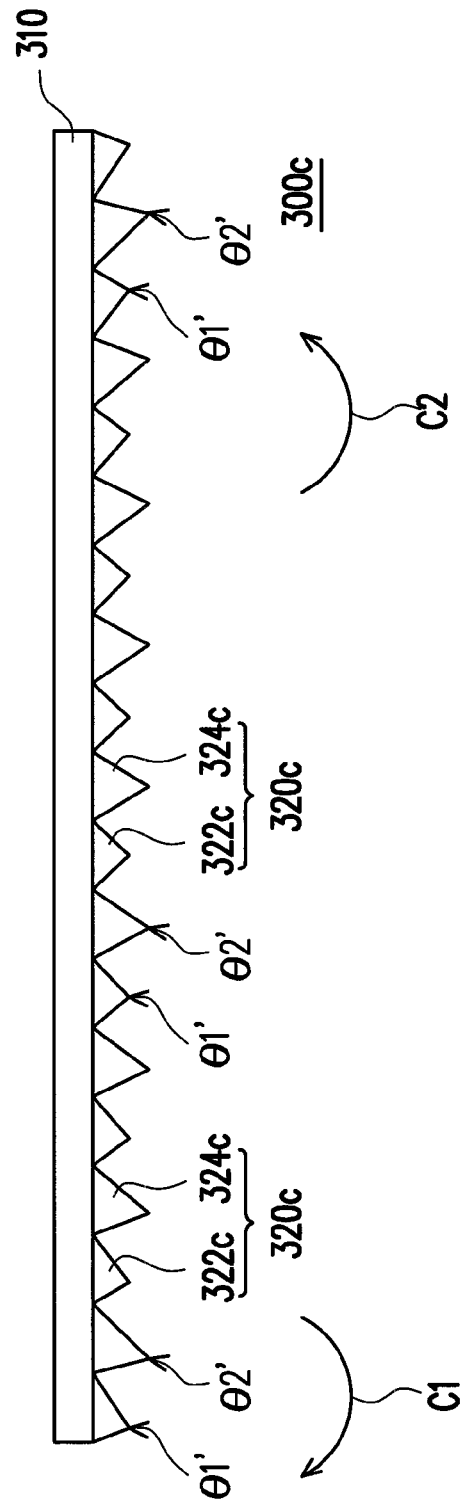
FIG. 5 is a cross-sectional view of a beam splitting film in a stereo display apparatus according to still another embodiment of the invention.

Referring to FIG. 5, the beam splitting film 300c of the embodiment is similar to the beam splitting film 300 of FIG. 1A, and differences therebetween are as follows. Since the viewing angles for the human eyes viewing a left part and a right part of the stereo display apparatus are different, when the stereo display apparatus has a large size, the viewing angle difference for viewing the left part and the right part of the stereo display apparatus may be greater. In this case, to improve a display correctness of the stereo image, the first vertex angles θ1' of the first strip protrusions 322c and the second vertex angles θ2' of the second strip protrusions 324c of the strip protrusion groups 320c are gradually rotated away from a center of the light transmissive plate 310 as locations thereof gradually depart from the center of the light transmissive plate 310. In FIG. 5, the first vertex angles θ1' and the second vertex angles θ2' located at a left part of the center of the light transmissive plate 310 are gradually rotated along a clockwise direction C1 as locations thereof gradually depart from the center of the light transmissive plate 310, and the first vertex angles θ1' and the second vertex angles θ2' located at a right part of the center of the light transmissive plate 310 are gradually rotated along an anticlockwise direction C2 as locations thereof gradually depart from the center of the light transmissive plate 310. In this way, the light beam passing through the left part of the beam splitting film 300c is slightly deflected rightwards, and the light beam passing through the right part of the beam splitting film 300c is slightly deflected leftwards, so as to improve the display correctness of the stereo image. A rotation degree of the first vertex angle θ1' and the second vertex angle θ2' may be adjusted according to the size of the stereo display apparatus, a suitable viewing distance of the users, and the other parameters.

Figure 6:
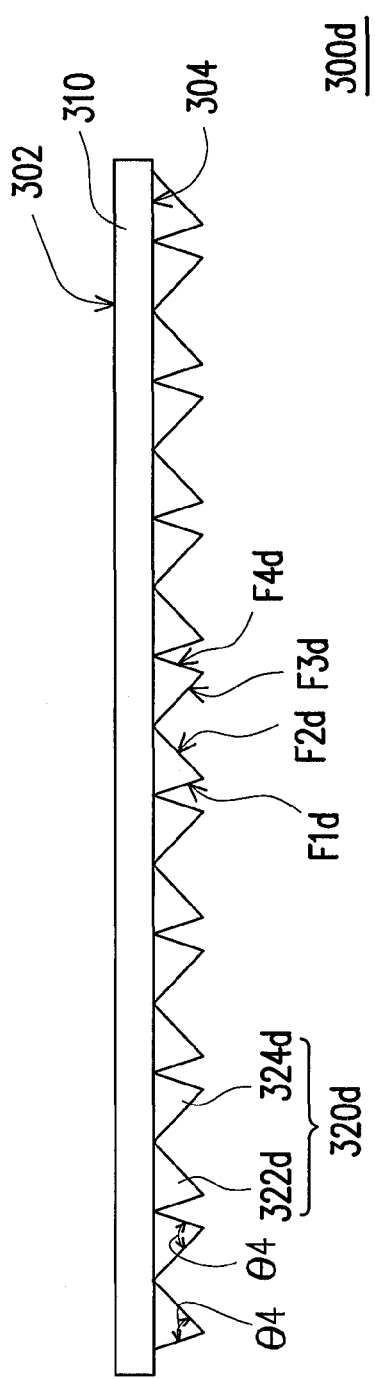
FIG. 6 is a cross-sectional view of a beam splitting film in a stereo display apparatus according to still another embodiment of the invention.

Referring to FIG. 6, the beam splitting film 300d of the embodiment is similar to the beam splitting film 300 of FIG. 1A, and differences therebetween are as follows. In the beam splitting film 300d of the embodiment, an absolute value of a slope of a first strip surface F1d of a first strip protrusion 322d of a strip protrusion group 320d is greater than an absolute value of a slope of a third strip surface F3d of a second strip protrusion 324d. However, an absolute value of a slope of a second strip surface F2d is smaller than an absolute value of a slope of a fourth strip surface F4d. Moreover, the absolute value of the slope of the first strip surface F1d is different to the absolute value of the slope of the second strip surface F2d, and the absolute value of the slope of the third strip surface F3d is different to the absolute value of the slope of the fourth strip surface F4d. Moreover, the strip surfaces with the negative values may have two different slopes, and the strip surfaces with the positive values may also have two different slopes, so as to generate two different vision zones. In other embodiments, the absolute value of the slope of the first strip surface F1d of the first strip protrusion 322d of the strip protrusion group 320d may be smaller than the absolute value of the slope of the third strip surface F3d of the second strip protrusion 324d, and the absolute value of the slope of the second strip surface F2d is greater than the absolute value of the slope of the fourth strip surface F4d. In the embodiment, the absolute value of the slope of the first strip surface F1d is substantially equal to the absolute value of the slope of the fourth strip surface F4d, and the absolute value of the slope of the second strip surface F2d is substantially equal to the absolute value of the slope of the third strip surface F3d, and a magnitude of a vertex angle θ4 at the junction of the first strip surface F1d and the second strip surface F2d is substantially equal to a magnitude of a vertex angle θ4 at the junction of the third strip surface F3d and the fourth strip surface F4d, though the invention is not limited thereto.

Figure 7:
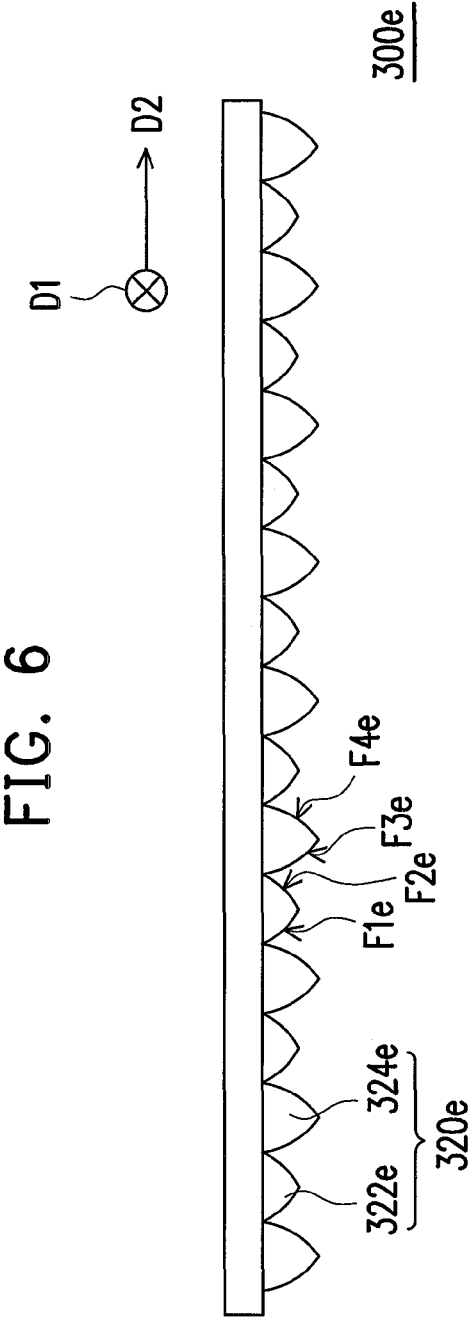
FIG. 7 is a cross-sectional view of a beam splitting film in a stereo display apparatus according to yet another embodiment of the invention.

Referring to FIG. 7, the beam splitting film 300e of the embodiment is similar to the beam splitting film 300 of FIG. 1A, and differences therebetween are as follows. In the beam splitting film 300e of the embodiment, a first strip surface F1e and a second strip surface F2e of a first strip protrusion 322e of a strip protrusion group 320e and a third strip surface F3e and a fourth strip surface F4e of a second strip protrusion 324e of the strip protrusion group 320e are respectively a curved surface. In the embodiment, the curved surfaces are all convex surfaces. Since each point on the curved surface has a different slope, an average slope of all points on the corresponding curved surface is used to describe an inclining degree of each of the first strip surface F1e, the second strip surface F2e, the third strip surface F3e, and the fourth strip surface F4e.

Similarly to the beam splitting film 300 of FIG. 1A, in the beam splitting film 300e of the embodiment, the average slope of the first strip surface F1e is different to the average slope of the third strip surface F3e, and the average slope of the second strip surface F2e is different to the average slope of the fourth strip surface F4e, so that two vision zones are formed.

The invention is not limited to a situation that all of the strip surfaces in each of the strip protrusion groups are planes or curved surfaces. In other embodiments, a part of the strip surfaces in each of the strip protrusion groups may be planes and another part thereof may be curved surfaces. For example, the first strip surface F1a, the second strip surface F1a, the third strip surface F3, and the fourth strip surface F4 of FIG. 2 may all be curved surfaces, or a part of them are planes and another part thereof are curved surfaces. The first strip surface F1, the second strip surface F2, the third strip surface F3, the fourth strip surface F4, the fifth strip surface F5, and the sixth strip surface F6 of FIG. 3 may all be curved surfaces, or a part of them are planes and another part thereof are curved surfaces. The first strip surface F1d, the second strip surface F2d, the third strip surface F3d, and the fourth strip surface F4d of FIG. 6 may all be curved surfaces, or a part of them are planes and another part thereof are curved surfaces.

In summary, the embodiments of the invention may have at least one of the following advantages or functions. In the beam splitting film, the backlight module, and the stereo display apparatus of the invention, since in each of the strip protrusion groups, the average slope of the first strip surface is different to the average slope of the third strip surface, and the average slope of the second strip surface is different to the average slope of the fourth strip surface, the first prism and the second prism may refract the light beam into different directions, so as to form a plurality of vision zones. In this way, multiple users may simultaneously view and share stereo images from different viewing angles.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. A backlight module, comprising:
    a beam splitting film, comprising:
        a light transmissive plate, having a first surface and a second surface opposite to the first surface, wherein the first surface is a light emitting surface; and
        a plurality of strip protrusion groups, disposed on the second surface, wherein each of the strip protrusion groups comprises a first strip protrusion and a second strip protrusion, the first strip protrusion and the second strip protrusion are disposed on the second surface and adjacent to each other, the first strip protrusion of each of the strip protrusion groups has a first strip surface and a second strip surface, the first strip surface and the second strip surface are inclined relative to the second surface, the second strip protrusion of each of the strip protrusion groups has a third strip surface and a fourth strip surface, the third strip surface and the fourth strip surface are inclined relative to the second surface, the second strip surface is located between the first strip surface and the third strip surface, the third strip surface is located between the second strip surface and the fourth strip surface, an inclining direction of the first strip surface relative to the second surface is the same as an inclining direction of the third strip surface relative to the second surface, an inclining direction of the second strip surface relative to the second surface is the same as an inclining direction of the fourth strip surface relative to the second surface, an average slope of the first strip surface relative to the second surface is not equal to an average slope of the third strip surface relative to the second surface, and an average slope of the second strip surface relative to the second surface is not equal to an average slope of the fourth strip surface relative to the second surface;
    a light guide plate, disposed at a side of the beam splitting film, wherein the light guide plate has a third surface, a fourth surface opposite to the third surface, and two light incident surfaces connected to the third surface and the fourth surface, the two light incident surfaces are respectively located at two opposite sides of the light guide plate, the third surface is located between the second surface and the fourth surface, and the second surface is located between the first surface and the third surface; and
    two light emitting devices, respectively disposed beside the two light incident surfaces and capable of emitting two light beams, wherein the two light beams are respectively capable of entering the light guide plate through the two light incident surfaces, and are capable of being transmitted to the beam splitting film through the third surface, and the two light emitting devices are capable of alternately flickering.

2. The backlight module as claimed in claim 1, wherein the first strip protrusions and the second strip protrusions extend along a first direction, and the first strip protrusions and the second strip protrusions are arranged along a second direction.

3. The backlight module as claimed in claim 2, wherein the first direction is substantially perpendicular to the second direction.

4. The backlight module as claimed in claim 1, wherein a junction of the first strip surface and the second strip surface forms a first vertex angle, a junction of the third strip surface and the fourth strip surface forms a second vertex angle, and a magnitude of the first vertex angle is different to a magnitude of the second vertex angle.

5. The backlight module as claimed in claim 4, wherein the first vertex angles and the second vertex angles are gradually rotated apart from a center of the light transmissive plate as locations thereof gradually depart from the center of the light transmissive plate.

6. The backlight module as claimed in claim 1, wherein heights of the first strip protrusion and the second strip protrusion of each of the strip protrusion groups along a direction perpendicular to the second surface are different.

7. The backlight module as claimed in claim 1, wherein widths of the first strip protrusion and the second strip protrusion of each of the strip protrusion groups along a direction parallel to the second surface are different.

8. The backlight module as claimed in claim 1, wherein each of the strip protrusion groups further comprises a third strip protrusion, the third strip protrusion has a fifth strip surface and a sixth strip surface, the fifth strip surface and the sixth strip surface are inclined relative to the second surface, an inclining direction of the fifth strip surface relative to the second surface is the same as inclining directions of the first strip surface and the third strip surface of the strip protrusion group relative to the second surface, an inclining direction of the sixth strip surface relative to the second surface is the same as inclining directions of the second strip surface and the fourth strip surface of the strip protrusion group relative to the second surface, an average slope of the fifth strip surface relative to the second surface is different to the average slope of the first strip surface relative to the second surface, and is different to the average slope of the third strip surface relative to the second surface, and an average slope of the sixth strip surface relative to the second surface is different to the average slope of the second strip surface relative to the second surface, and is different to the average slope of the fourth strip surface relative to the second surface.

9. The backlight module as claimed in claim 1, wherein at least one of the first strip surface, the second strip surface, the third strip surface, and the fourth strip surface is a plane.

10. The backlight module as claimed in claim 1, wherein at least one of the first strip surface, the second strip surface, the third strip surface, and the fourth strip surface is a curved surface.

11. A stereo display apparatus, comprising:
a backlight module, comprising:
  a beam splitting film, comprising:
    a light transmissive plate, having a first surface and a second surface opposite to the first surface, wherein the first surface is a light emitting surface; and
    a plurality of strip protrusion groups, disposed on the second surface, wherein each of the strip protrusion groups comprises a first strip protrusion and a second strip protrusion, the first strip protrusion and the second strip protrusion are disposed on the second surface and are adjacent to each other, the first strip protrusion of each of the strip protrusion groups has a first strip surface and a second strip surface, the first strip surface and the second strip surface are inclined relative to the second surface, the second strip protrusion of each of the strip protrusion groups has a third strip surface and a fourth strip surface, the third strip surface and the fourth strip surface are inclined relative to the second surface, the second strip surface is located between the first strip surface and the third strip surface, the third strip surface is located between the second strip surface and the fourth strip surface, an inclining direction of the first strip surface relative to the second surface is the same as an inclining direction of the third strip surface relative to the second surface, an inclining direction of the second strip surface relative to the second surface is the same as an inclining direction of the fourth strip surface relative to the second surface, an average slope of the first strip surface relative to the second surface is not equal to an average slope of the third strip surface relative to the second surface, and an average slope of the second strip surface relative to the second surface is not equal to an average slope of the fourth strip surface relative to the second surface;
  a light guide plate, disposed at a side of the beam splitting film, wherein the light guide plate has a third surface, a fourth surface opposite to the third surface, and two light incident surfaces connected to the third surface and the fourth surface, the two light incident surfaces are respectively located at two opposite sides of the light guide plate, the third surface is located between the second surface and the fourth surface, and the second surface is located between the first surface and the third surface; and
  two light emitting devices, respectively disposed beside the two light incident surfaces and capable of emitting two light beams, wherein the two light beams are respectively capable of entering the light guide plate through the two light incident surfaces, and are capable of being transmitted to the beam splitting film through the third surface, and the two light emitting devices are capable of alternately flickering; and
a liquid crystal display panel, disposed at a side of the backlight module, wherein the first surface is located between the liquid crystal display panel and the second surface.

12. The stereo display apparatus as claimed in claim 11, wherein each of the first strip protrusions and the second strip protrusions extends along a first direction, and the first strip protrusions and the second strip protrusions are arranged along a second direction.

13. The stereo display apparatus as claimed in claim 12, wherein the first direction is substantially perpendicular to the second direction.

14. The stereo display apparatus as claimed in claim 11, wherein a junction of the first strip surface and the second strip surface forms a first vertex angle, a junction of the third strip surface and the fourth strip surface forms a second vertex angle, and a magnitude of the first vertex angle is different to a magnitude of the second vertex angle.

15. The stereo display apparatus as claimed in claim 14, wherein the first vertex angles and the second vertex angles are gradually rotated apart from a center of the light transmissive plate as locations thereof gradually depart from the center of the light transmissive plate.

16. The stereo display apparatus as claimed in claim 11, wherein heights of the first strip protrusion and the second strip protrusion of each of the strip protrusion groups along a direction perpendicular to the second surface are different.

17. The stereo display apparatus as claimed in claim 11, wherein widths of the first strip protrusion and the second strip protrusion of each of the strip protrusion groups along a direction parallel to the second surface are different.

18. The stereo display apparatus as claimed in claim 11, wherein each of the strip protrusion groups further comprises a third strip protrusion, the third strip protrusion has a fifth strip surface and a sixth strip surface, the fifth strip surface and the sixth strip surface are inclined relative to the second surface, an inclining direction of the fifth strip surface relative to the second surface is the same as inclining directions of the first strip surface and the third strip surface of the strip protrusion group relative to the second surface, an inclining direction of the sixth strip surface relative to the second surface is the same as inclining directions of the second strip surface and the fourth strip surface of the strip protrusion group relative to the second surface, an average slope of the fifth strip surface relative to the second surface is different to the average slope of the first strip surface relative to the second surface, and is different to the average slope of the third strip surface relative to the second surface, and an average slope of the sixth strip surface relative to the second surface is different to the average slope of the second strip surface relative to the second surface, and is different to the average slope of the fourth strip surface relative to the second surface.

19. A beam splitting film, comprising:
  a light transmissive plate, having a first surface and a second surface opposite to the first surface, wherein the first surface is a light emitting surface; and
  a plurality of strip protrusion groups, disposed on the second surface, wherein each of the strip protrusion groups comprises a first strip protrusion and a second strip protrusion, the first strip protrusion and the second strip protrusion are disposed on the second surface and are adjacent to each other, the first strip protrusion of each of the strip protrusion groups has a first strip surface and a second strip surface, the first strip surface and the second strip surface are inclined relative to the second surface, the second strip protrusion of each of the strip protrusion groups has a third strip surface and a fourth strip surface, the third strip surface and the fourth strip surface are inclined relative to the second surface, the second strip surface is located between the first strip surface and the third strip surface, the third strip surface is located between the second strip surface and the fourth strip surface, an inclining direction of the first strip surface relative to the second surface is the same as an inclining direction of the third strip surface relative to the second surface, an inclining direction of the second strip surface relative to the second surface is the same as an inclining direction of the fourth strip surface relative to the second surface, an average slope of the first strip surface relative to the second surface is not equal to an average slope of the third strip surface relative to the second surface, and an average slope of the second strip surface relative to the second surface is not equal to an average slope of the fourth strip surface relative to the second surface, wherein a junction of the first strip surface and the second strip surface forms a first vertex angle of the first strip protrusion apart from the second surface, a junction of the third strip surface and the fourth strip surface forms a second vertex angle of the second strip protrusion apart from the second surface, and a magnitude of the first vertex angle is different to a magnitude of the second vertex angle and wherein the first vertex angles and the second vertex angles are gradually rotated apart from a center of the light transmissive plate as locations thereof gradually depart from the center of the light transmissive plate.

20. The beam splitting film as claimed in claim 19, wherein each of the strip protrusion groups further comprises a third strip protrusion, the third strip protrusion has a fifth strip surface and a sixth strip surface, the fifth strip surface and the sixth strip surface are inclined relative to the second surface, an inclining direction of the fifth strip surface relative to the second surface is the same as inclining directions of the first strip surface and the third strip surface of the strip protrusion group relative to the second surface, an inclining direction of the sixth strip surface relative to the second surface is the same as inclining directions of the second strip surface and the fourth strip surface of the strip protrusion group relative to the second surface, an average slope of the fifth strip surface relative to the second surface is different to the average slope of the first strip surface relative to the second surface, and is different to the average slope of the third strip surface relative to the second surface, and an average slope of the sixth strip surface relative to the second surface is different to the average slope of the second strip surface relative to the second surface, and is different to the average slope of the fourth strip surface relative to the second surface.

* * * * *